(12) United States Patent
Mizutani et al.

(10) Patent No.: US 6,755,943 B1
(45) Date of Patent: Jun. 29, 2004

(54) PERFORATED TRAY WITHOUT DOWNCOMER, PERFORATED TRAY TOWER WITHOUT DOWNCOMER

(75) Inventors: Noriaki Mizutani, Himeji (JP); Takeshi Nishimura, Himeji (JP); Yukihiro Matsumoto, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/506,713

(22) Filed: Feb. 18, 2000

(30) Foreign Application Priority Data

Feb. 18, 1999 (JP) ............................................ 11-040276

(51) Int. Cl.[7] .......................... B01D 3/32; C07C 51/44
(52) U.S. Cl. ................ 203/99; 203/100; 203/DIG. 21; 261/113; 261/114.5; 202/158; 562/600
(58) Field of Search ................. 203/99, 100, DIG. 21, 203/8, 9; 202/158; 261/113, 114.1, 114.4, 114.5, 128, 147; 562/600

(56) References Cited

U.S. PATENT DOCUMENTS

| | | | |
|---|---|---|---|
| 3,717,553 A | | 2/1973 | Otsuki et al. ............... 202/158 |
| 3,792,843 A | * | 2/1974 | Stage ...................... 196/14.52 |
| 3,941,572 A | * | 3/1976 | Uchiyama et al. .......... 261/113 |
| 3,988,213 A | | 10/1976 | Yoshida et al. ................ 203/9 |
| 4,263,021 A | * | 4/1981 | Downs et al. .............. 261/113 |
| 4,405,449 A | * | 9/1983 | Trager ........................ 196/139 |
| 5,185,017 A | * | 2/1993 | Tanigawa et al. ........ 261/114.2 |
| 6,165,315 A | * | 12/2000 | Jonckers et al. ........... 159/47.2 |
| 6,254,840 B1 | * | 7/2001 | Mennen ...................... 261/113 |

FOREIGN PATENT DOCUMENTS

| | | | |
|---|---|---|---|
| DE | WO 97/45184 | | 4/1997 |
| EP | 0 856 343 A1 | | 8/1998 |
| JP | 10-76103 | | 3/1998 |

OTHER PUBLICATIONS

EP 00 10 3058—European Search Report.
"Handbook of Distillation Engineering", edited by Hirata Mitsuho and Yorimitsu Masahiro. Published by Asakura Shoten Oct. 20, 1966. Pp. 332 & 333; 341 & 342. Partial Translation of Relevant Passages provided.
"Properties of Perforated Trays Devoid of Downcomers", by Naoto Hashimoto and Sadao Masuda. Chemical Engineering, vol. 34, No. 6, (1970), pp. 567–571. Complete Translation provided.

* cited by examiner

*Primary Examiner*—Virginia Manoharan
(74) *Attorney, Agent, or Firm*—Edwards & Angell, LLP; David G. Conlin; Lisa Swiszcz Hazzard

(57) ABSTRACT

A perforated tray without downcomer in accordance with the present invention satisfies following conditions: (a) The hole has a diameter of 10 mm to 25 mm. (b) Two adjacent holes are spaced by a distance of 1.2 d to 3 d, measured between the two centers. (c) The tray thickness is 2 mm to 8 mm. (d) The opening ratio is 10% to 30%. A perforated tray tower without downcomer fitted with two or more such perforated trays without downcomer in accordance with the present invention satisfies following conditions: (g) Perforated trays are spaced by a distance of 0.1 D to 0.5 D (D denotes the tower diameter). (h) The levelness of each perforated tray is 8 mm or less. (i) If a plurality of perforated trays are used at the same stage, the two most closely located holes that respectively belong to adjacent perforated trays are spaced by a distance of 50 mm to 150 mm, measured between the two centers. By using the perforated tray tower without downcomer, an easily polymerizable compound, such as an (meth)acrylic acid, or a liquid containing such an easily polymerizable compound can be distilled in a stable manner over an extended period of time with the formation of polymers being effectively prevented.

10 Claims, 8 Drawing Sheets

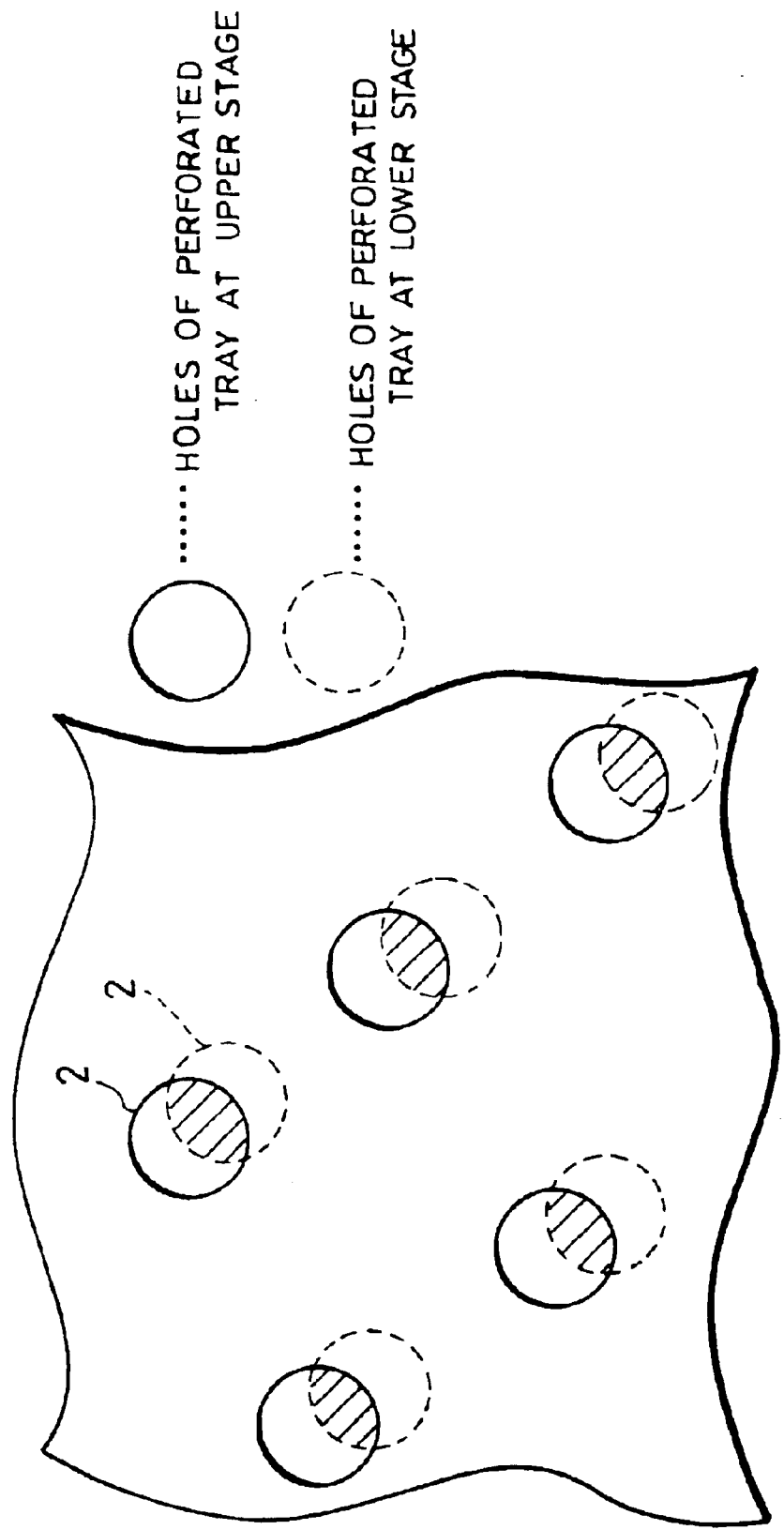

US 6,755,943 B1

PERFORATED TRAY WITHOUT DOWNCOMER, PERFORATED TRAY TOWER WITHOUT DOWNCOMER

FIELD OF THE INTENTION

The present invention relates to a perforated tray without downcomer, a perforated tray tower without downcomer, and a method of distillation, and in particular, relates to (1) a perforated tray without downcomer that enables stable distillation of an easily polymerizable compound, such as (meth)acrylic acid, and a liquid containing such an easily polymerizable compound (hereinafter, may be referred to collectively as "an easily polymerizable compound") over an extended period of time while effectively inhibiting the formation of polymers, (2) a perforated tray tower without downcomer fitted with such perforated trays without downcomer, and (3) a method of distillation using the perforated tray tower without downcomer.

BACKGROUND OF THE INVENTION

To manufacture commercial products, it is widely practiced in the manufacturing industry to distil and refine an easily polymerizable compound, such as (meth)acrylic acid or an ester thereof, in the presence of oxygen or a polymerization inhibitor for the purpose of preventing polymerization of the compound. Besides, it is well known that perforated trays without downcomer and a perforated tray tower without downcomer fitted with the trays are used for distillation.

Each perforated tray without downcomer disposed in such a perforated tray tower without downcomer has holes formed almost uniformly all over the tray, except for those holes for clamps, bolts, etc. that attach the tray to a support beam, a support ring, etc. Typically, the holes (perforations) are formed by a punching press or a drill. It is known that in a perforated tray without downcomer, specifications on, among other things, the hole diameter and the hole shape, the tray thickness, and the opening ratio, are very important factors in improving performance, as well as specifications on the tray-to-tray interval and the levelness when the perforated tray without downcomer is disposed in the perforated tray tower without downcomer (See, *Properties of Perforated Trays Without Downcomer*, Vol. 34, Chemical Engineering, page 567 to 571, 1970, by Hashimoto et al, and *Distillation Engineering Handbook* published by Asakura Shoten 1966).

However, in some cases, distillation of, for example, (meth)acrylic acid, using the conventional perforated tray tower without downcomer causes formation of a polymer which should be removed manually or chemically after suspension of the operation.

Accordingly, to solve the above problems, techniques, each realizing a specific state, are suggested as follows to further inhibit polymerization during distillation using the perforated tray tower without downcomer. Each technique is aimed at improving inhibition of polymerization by using a polymerization inhibitor (stabilizer agent).

In a first state, the inside of the perforated tray tower without downcomer is wet with a liquid containing an easily polymerizable compound. This is aimed at bringing a gaseous phase portion into contact with a polymerization inhibitor by bringing the gaseous phase portion into contact with a liquid phase portion, because the polymerization inhibitor is present primarily in the liquid phase portion (liquid portion) and less so in the gaseous phase portion (gas portion).

U.S. Pat. No. 3,717,553 discloses an example of a specific technique to effect the first state, whereby the holes of the perforated tray near the inner wall of the tower are formed with an extended diameter or is arranged to form a slit, so that the inner wall of the tower and the back surface of the perforated tray are completely wet with liquid.

U.S. Pat. No. 3,988,213 discloses a technique to prevent polymerization on the tower wall by effecting the opposite to the first state, whereby the temperature of the tower wall is kept higher than that of the gaseous phase portion by providing a jacket so as to prevent the gas including no polymerization inhibitor from condensing and polymerizing on the tower wall.

In a second state, gas and/or liquid currents are prevented from channelling and stagnating. This is aimed at preventing the polymerization inhibitor from being unevenly distributed or insufficiently dispersed due to channelling and stagnating currents.

Japanese Laid-Open Patent Application No. 10-212249/1998 (Tokukaihei 10-212249) and corresponding European Published Patent Application 0 856 343 A1 disclose an example of a specific technique to effect the second state, whereby a support ring (perforated tray support member) is punched to form a hole through which the liquid on the support ring flows down smoothly. Japanese Laid-Open Patent Application No. 10-76103/1998 (Tokukaihei 10-76103) discloses another example of a specific technique to effect the second state, whereby the perforated trays without downcomer are separated from the tower wall by a distance of 1 mm to 15 mm to prevent liquid currents from channelling and stagnating near the tower wall.

Each of these techniques is able to prevent the formation of polymers to some extent, but not sufficiently. The conventional techniques, although successfully effecting either the first state or the second state through an additional specified arrangement in the tower and perforated trays, fails to concurrently and surely effect both the states.

Another problem is that providing a jacket as above requires large investments in equipment and strict temperature controls, which is not very practical. Further referring to the jacket method above, the tower wall is not made wet (kept dry) so as to prevent the gas from condensing, thus effecting a state that is opposite to the first state.

Accordingly, there is a demand for a distillation technique to concurrently and surely effect both the first state and the second state, and eventually to more effectively prevent the formation of polymers and perform stable distillation over an extended period of time.

SUMMARY OF THE INVENTION

In view of the above problems, the present invention has an object to offer a perforated tray without downcomer, a perforated tray tower without downcomer, and a method of distillation that are capable of effectively preventing the formation of polymers and stably distil an easily polymerizable compound, such as (meth)acrylic acid, over an extended period of time, and that are especially suited for use in distillation of an easily polymerizable compound, such as (meth)acrylic acid.

The inventors of the present invention have diligently worked to achieve the object, and as a result, have found that both the first state and the second state can be surely effected so that a stable distillation can be carried out over an extended period of time with the formation of polymers being effectively prevented, if (i) the thickness and opening ratio of the perforated tray without downcomer, as well as the hole diameters and the hole pitches, are regulated in specific ranges, (ii) the intervals between, and the inclinations (levelness) of, the perforated trays without downcomer disposed in the tower, as well as the distance between the two most closely located holes when a plurality of perforated tray without downcomer is used at the same stage, are regulated in specific ranges, and (iii) the perforated tray tower without downcomer is used for distillation under specific conditions, which has led to the completion of the invention.

Specifically, in order to achieve the foregoing object, the perforated tray without downcomer in accordance with the present invention satisfies following conditions (a) to (d):

(a) The hole diameter, d, is in a range of from 10 mm to 25 mm.

(b) The center-to-center distance between two adjacent holes is in a range of from 1.2 d to 3 d.

(c) The tray thickness is in a range of from 2 mm to 8 mm.

(d) The opening ratio is in a range of from 10% to 30%.

Further, the perforated tray tower without downcomer in accordance with the present invention is fitted with two or more such perforated trays without downcomer and satisfies following conditions:

(g) The interval between the perforated trays without downcomer is in a range of from 0.1 D to 0.5 D, where D is the tower diameter.

(h) The levelness of the perforated tray does not exceed 8 mm.

(i) The two most closely located holes that belong respectively to adjacent perforated trays without downcomer are separated by a distance ranging from 50 mm to 150 mm when a plurality of perforated trays without downcomer are used at the same stage.

Further, the method of distillation in accordance with the present invention is a method to distil an easily polymerizable compound or a liquid containing an easily polymerizable compound, using the perforated trays without downcomer.

Distillation of an easily polymerizable compound by means of specified perforated trays without downcomer or perforated tray tower without downcomer satisfying the foregoing conditions have at least following advantages:

(1) The gas and liquid flow uniformly on the perforated tray without downcomer with a smaller gradient in liquid concentration and a more uniform dispersion in concentration of polymerization inhibitors.

(2) The gas and liquid flow smoothly without channelling, and stagnate for a relatively short period of time.

(3) The perforated tray without downcomer and the inner walls of the tower are wet with a liquid containing a polymerization inhibitor. The inside of the tower is therefore almost completely wet with no parts being left dry.

(4) The liquid does not stagnate on the perforated tray without downcomer.

According to the present invention and its advantages described above, both the first state and the second state are concurrently and surely effected with the formation of polymers being effectively prevented.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) corresponds to a cross-sectional view taken along line B—B in the extended perforated tray shown in FIG. 4 and FIG. 5(a), and FIG. 6(b) corresponds to a cross-sectional view taken along line A—A in the extended perforated tray shown in FIG. 4 and FIG. 5(a).

FIG. 7 is an explanatory drawing showing, in the perforated tray tower without downcomer shown in FIG. 3, a hole of the perforated tray at the upper stage, which is used as a basis in calculating the blind ratio, overlapping a hole of the perforated tray at the lower stage.

DESCRIPTION OF THE EMBODIMENTS

Referring to drawings, the following will discuss an embodiment in accordance with the present invention. Note that hereinafter in some cases the perforated tray without downcomer will be referred to simply as the perforated tray, and the perforated tray tower without downcomer as the tower.

Figure 1:
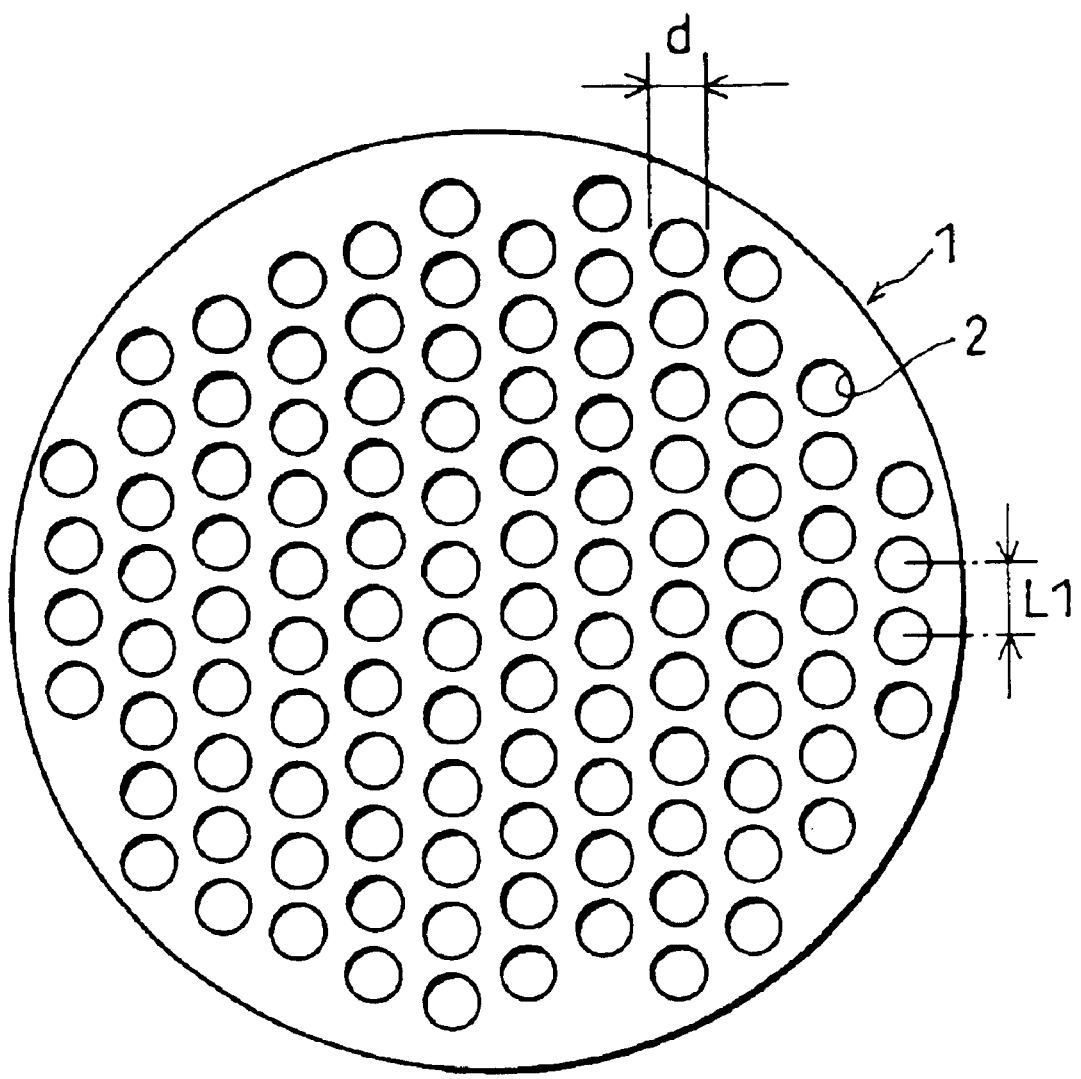
FIG. 1 is a cross-sectional view showing an arrangement of a perforated tray without downcomer of an embodiment in accordance with the present invention.

FIG. 1 is an explanatory drawing showing a perforated tray without downcomer 1, that is an embodiment of the present invention. As shown in FIG. 1, the perforated tray 1 in accordance with the present invention is perforated with a plurality of holes 2 that have substantially equal diameters and are mutually separated by substantially equal distances that satisfy condition (b) below. As to the holes 2, conditions (a) to (d) are specified:

(a) The hole has a diameter, d, in a range of from 10 mm to 25 mm, and preferably in a range of from 12 mm to 22 mm.

(b) The hole 2 is separated from an adjacent hole 2 by a distance, L1, in a range of from 1.2 d to 3 d, and preferably, in a range of from 1.5 d to 2.5 d, where the distance L1 is measured as the distance between the centers of the two holes 2.

(c) The tray has a thickness in a range of from 2 mm to 8 mm, and preferably, in a range of from 2 mm to 4 mm.

(d) The opening ratio is in a range of from 10% to 30%, and preferably, in a range of from 12% to 27%.

In the present invention, the opening ratio is defined as a ratio (percentage points) of the sum of the areas of the holes 2 of the perforated tray 1 to the horizontal cross-sectional area of the tower (perforated tray tower without downcomer) in which the perforated tray 1 is disposed. Accordingly, the opening ratio is given by the equation:

$$\text{Opening Ratio } (\%) = (P/Q) \times 100$$

where P is the sum of the areas of the holes 2 (the holes 2 as a whole will be collectively referred to as an opening section), and Q is the horizontal cross-sectional area of the tower in which the perforated tray 1 is disposed.

In some cases, the perforated tray 1 cannot accommodate holes 2 satisfying conditions (a) and (b) along its periphery. If this is the case, smaller holes may be provided without necessarily satisfying conditions (a) and (b). The arrangement enables gas and liquid currents to reach the periphery of the perforated tray 1, preventing liquid currents from stagnating and thus polymers from being formed.

Using a tower fitted with perforated trays 1 in compliance with conditions (a) to (d), an easily polymerizable compound can be distilled while effectively preventing the formation of polymers. The following will discuss the reasons why.

Supposing that the opening ratio is fixed to a certain value, a hole diameter of less than 10 mm does not allow the liquid to fall down through the hole 2 smoothly, and increases the likelihood of polymerization occurring; by contrast, a hole diameter exceeding 25 mm causes liquid currents to stagnate in the extended space created between adjacent holes 2, and increases the likelihood of polymerization occurring.

A center-to-center distance, L1, between adjacent holes 2 of less than 1.2 d segregates gas and liquid currents. A center-to-center distance L1 exceeding 3d causes liquid currents to stagnate in the extended space created between adjacent holes 2, and increase the likelihood of polymerization occurring.

A tray thickness of less than 2 mm allows the perforated tray 1 to vibrate and thereby causes a liquid gradient to develop on the perforated tray 1, and increases the likelihood of parts of the perforated tray 1 drying up. A tray thickness exceeding 8 mm causes liquid currents to stagnate in the holes 2, and increases the likelihood of polymerization occurring.

Supposing that the hole diameter is fixed to a certain value, an opening ratio of less than 10% causes liquid currents to stagnate, and increases the likelihood of polymerization occurring; by contrast, an opening ratio exceeding 30% segregates gas and liquid currents, and increases the likelihood of polymerization occurring.

In the technology using perforated trays without downcomer 1 in accordance with the present invention, an easily polymerizable compound is subjected to a gas and liquid contact by allowing some of the liquid to fall down through the holes 2 and the gas to go up through the holes 2 while holding some of the liquid on the perforated tray 1. So, the liquid and gas currents through the holes 2 need to be controlled so as to create a desirable state, which was extremely difficult to achieve with conventional technology.

In the present invention, by satisfying all conditions (a) to (d), the down currents of the liquid and the up currents of the gas through the holes 2 are controlled to achieve a desirable state and eventually to surely effect a gas and liquid contact. Further, when the gas and liquid currents flowing through the holes 2 are controlled appropriately, the liquid is held on the perforated tray 1 in a suitable manner, more evenly dispersed on the perforated tray 1, and sufficiently wets the inner surfaces of the perforated tray tower without downcomer fitted with the perforated trays 1.

Accordingly, in the present invention, the use of the perforated trays 1 that satisfy conditions (a) to (d) concurrently and surely effects both the first state where the inner walls of the perforated tray tower without downcomer fitted with the perforated trays 1 are wet with liquid and the second state where gas and liquid currents are prevented from channelling and stagnating. Hence, polymerization is better inhibited.

Figure 2A:
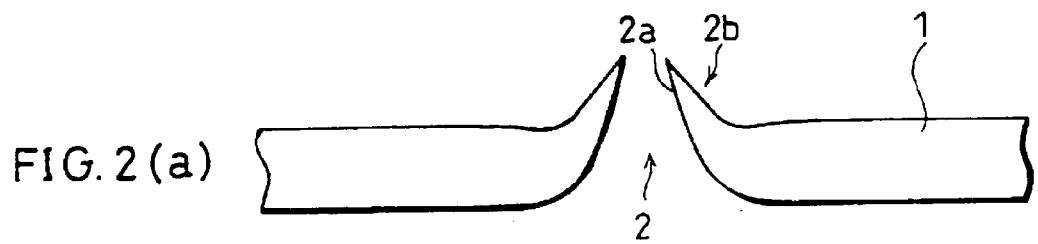
FIG. 2(a) to FIG. 2(e) are explanatory drawings showing variations of the cross-section of a hole shape of the perforated tray without downcomer shown in FIG. 1.

The holes 2 of the perforated tray 1 are formed using a punching press, drill, etc., as previously mentioned; therefore, the edge 2a of the hole 2 warps after the formation of the hole 2 as shown in FIG. 2(a). The warping protrusion 2b, if left as it is, disrupts smooth liquid currents and increases the likelihood of polymerization occurring.

Figure 2B:
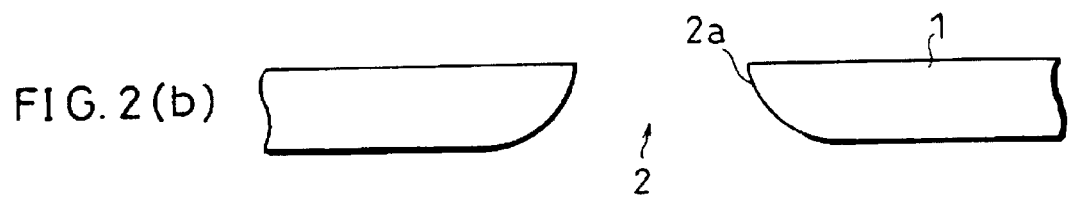
Figure 2C:
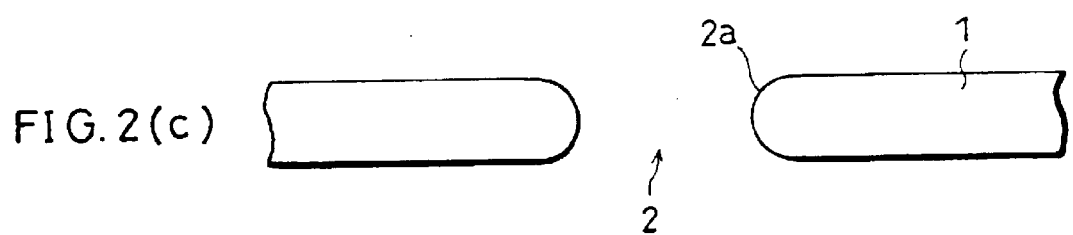
Figure 2D:
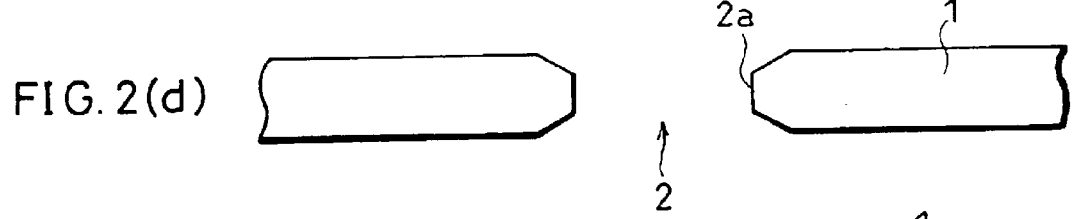
Figure 2E:
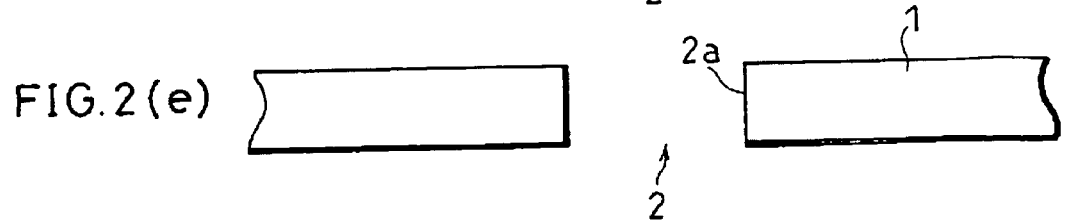

Accordingly, as to the perforated tray 1 in accordance with the present invention, the protrusion 2b is preferably removed. More preferably, the hole edge 2a is fabricated into a smooth, round shape, either on the upper side or on the lower side as shown in FIG. 2(b), or on both sides. The dimensions and shape of the round edge is not restricted in any manner, provided that it facilitates the down currents of the liquid: FIG. 2(d) shows such an example where the hole edge 2a is cut into an angular shape. Furthermore, the smooth, round edge, although preferable, is not always essential: the hole edges 2a may be flat, instead of being round and smooth, both on the upper side and on the lower side as shown in FIG. 2(e).

Based on the foregoing, in the perforated tray without downcomer 1 in accordance with the present invention, in addition to conditions (a) to (d), at least one of following conditions (e) and (f) is satisfied. By satisfying all these conditions, the first and second states are better effected; hence the formation of polymers are more effectively prevented in the distillation of an easily polymerizable compound.

(e) The surface of the perforated tray 1 is substantially flat.

(f) The edge of the hole 2 is rounded at least either on the upper side or on the lower side.

Note that among conditions (a) to (f), the satisfaction of condition (b) is particularly preferred and gives advantages to the perforated tray without downcomer 1 in accordance with the present invention over conventional technology.

Figure 3:
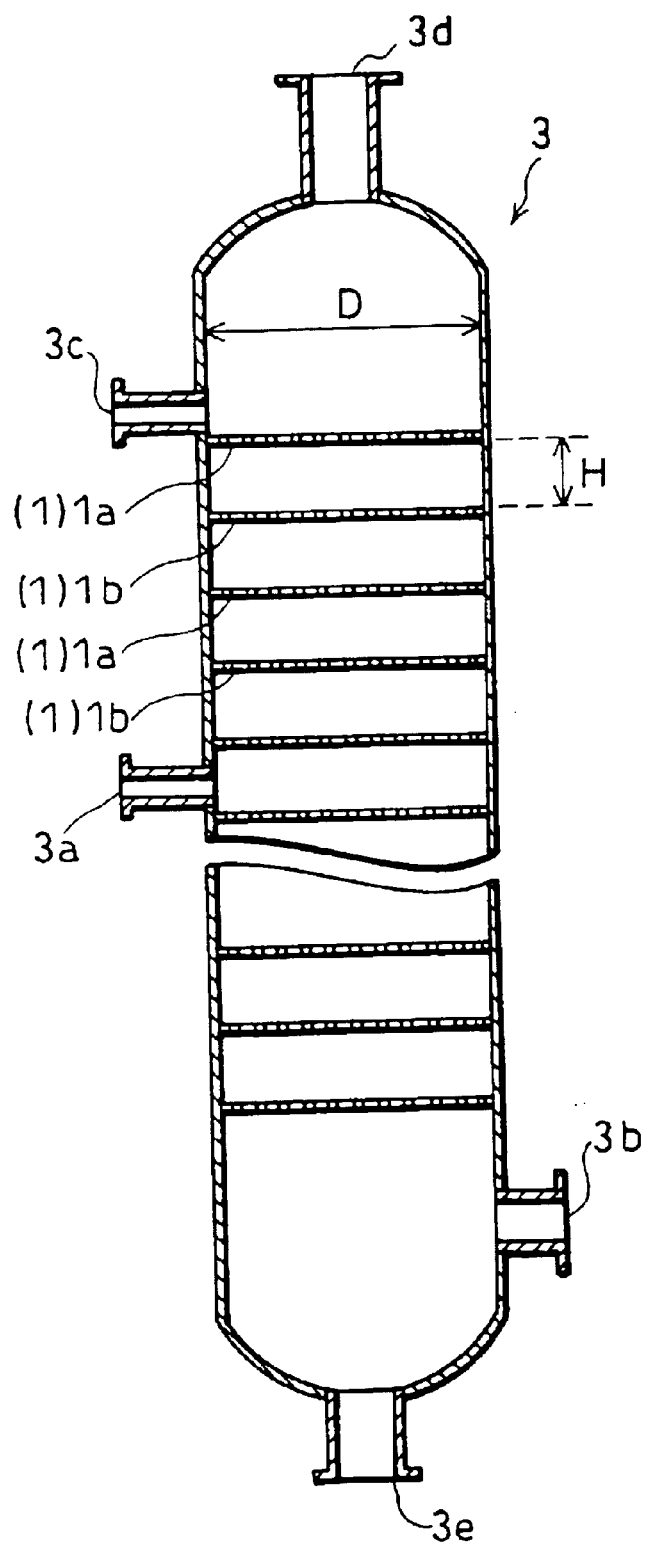
FIG. 3 is an explanatory drawing showing an example of a cross-section of a perforated tray tower without downcomer, in accordance with the present invention, fitted with perforated trays without downcomer that are identical to that shown in FIG. 1.

The following will discuss a perforated tray tower without downcomer in accordance with the present invention. A perforated tray tower without downcomer 3 in accordance with the present invention, as shown in FIG. 3, is fitted with two or more perforated trays 1 that are configured like shelves according to the conditions specified below.

(g) The perforated trays 1 disposed respectively at vertically adjacent spacing are separated by an interval H in a range of from 0.1 D to 0.5 D, where D is the tower diameter.

(h) Each perforated tray 1 has a levelness not exceeding 8 mm, preferably not exceeding 4 mm. That is, the levelness is preferably less than 8 mm, and more preferably less than 4 mm.

(i) If a plurality of perforated trays 1 are used at the same stage, the center-to-center distance, L2, between the two most closely located holes 2 that respectively belong to adjacent perforated trays 1 is in a range of from 50 mm to 150 mm, and preferably from 50 mm to 100 mm.

In FIG. 3, the topmost tray in the tower 3 is defined as the first tray, whereas the perforated trays 1 at odd numbered trays are denoted as 1a and the perforated trays 1 at even numbered trays are denoted as 1b.

Further, as shown in FIG. 3, there are provided a feed inlet 3a, a vapor inlet 3b, and a reflux 3c on a side of the tower 3, a vapor outlet 3d on the top of the tower 3, and a liquid outlet 3e on the bottom of the tower 3. In FIG. 3, the feed inlet 3a is disposed in a middle part of the tower 3, the ref lux 3c is disposed above the first tray, and the vapor inlet 3b is disposed below the bottom tray.

The feed inlet 3a is for supplying an easily polymerizable compound, and is disposed to a top, middle, or bottom part of the tower 3 depending on the liquid composition of the easily polymerizable compound. The vapor outlet 3d is connected to a condenser (not shown). The vapor (gas) of the easily polymerizable compound is discharged through the vapor outlet 3d and condensed in the condenser. Part of the liquid is withdrawn, while the rest is reintroduced into the tower 3 through the reflux 3c.

The liquid outlet 3e is connected to a reboiler (not shown). The easily polymerizable compound (liquid) is withdrawn from the tower 3 through the liquid outlet 3e. Part of the liquid is withdrawn, while the rest is fed to the reboiler where the liquid is boiled again. The reboiled easily polymerizable compound, including mixture of gas and liquid, is reintroduced to the tower 3 through the vapor inlet 3b.

The arrangement to supply and reintroduce the gas and liquid of the easily polymerizable compound into the tower explained above is intended to be a mere example; no constraints are imposed on the arrangement, and any conventional arrangement can be suitably used in place of this example.

If the interval H by which the perforated trays 1 disposed respectively at vertically adjacent spacing are separated in the tower 3 (see FIG. 3) is less than 0.1 D (i.e., less than 10% of the tower diameter), gas currents are likely to channel, increasing the likelihood of polymerization occurring. If the interval H exceeds 0.5 D (i.e., 50% of the tower diameter), the gas currents stagnate for too long a time, increasing the likelihood of polymerization occurring in a gaseous phase portion.

If the levelness of the perforated tray 1 exceeds 8 mm, the liquid gradient grows on the perforated tray 1 and causes gas and liquid currents to channel in a relatively large scale, increasing the likelihood of polymerization occurring. The levelness is defined as the difference between the highest and lowest points in a perforated tray 1. The levelness is measured by an ordinary method using a water manometer.

No particular constrains are imposed on the perforated tray 1 in accordance with the present invention in terms of its shape; the perforated tray 1 may be, for example, of a semicircular, partially deformed circular, sectorial, or square shape, as well as of the circular shape shown in FIG. 1.

Figure 4:
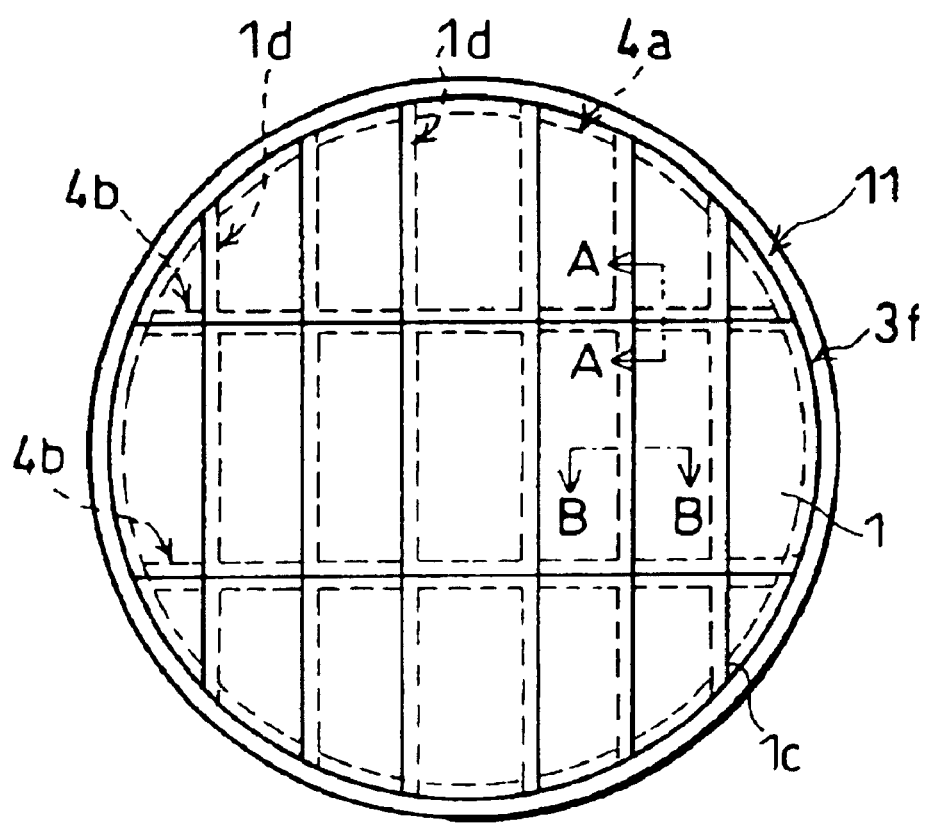
FIG. 4 is an explanatory drawing showing assembly of an extended perforated tray from a plurality of perforated trays without downcomer disposed at the same stage.

When the perforated tray tower without downcomer 3 has a relatively large diameter, two or more perforated trays 1 are typically disposed at the same stage as shown in FIG. 4, with the installation through a manhole being taken into consideration. In other words, an extended perforated tray 11 is assembled from a plurality of perforated trays 1. When this is the case, the perforated trays 1 may either share an identical shape or have different shapes; for example, some of the perforated trays 1 have partially deformed circular shapes while the others have square shapes.

In FIG. 4, 21 perforated trays 1, including 17 perforated trays 1 of substantially rectangular shapes (of differing sizes) and four perforated trays 1 of a substantially triangular shape, constitute a single circular extended perforated tray 11. In FIG. 4, holes 2 are omitted for convenience. Further, the perforated trays 1 are supported by a support ring 4a (illustrated like a ring in FIG. 4) and support beams 4b (illustrated like horizontal elongated rectangles in FIG. 4); the support ring 4a and support beams 4b constitute support members, and those parts corresponding to the support members are represented by dotted lines in FIG. 4. Also, those parts 1d (illustrated like vertical elongated rectangles in FIG. 4) where perforated trays 1 overlap adjacent perforated trays 1 at their edges are represented by dotted lines. The above-mentioned parts are collectively referred to as a fixing area. The peripheral part shown in FIG. 4 represents a tower wall 3f.

Figure 5A:
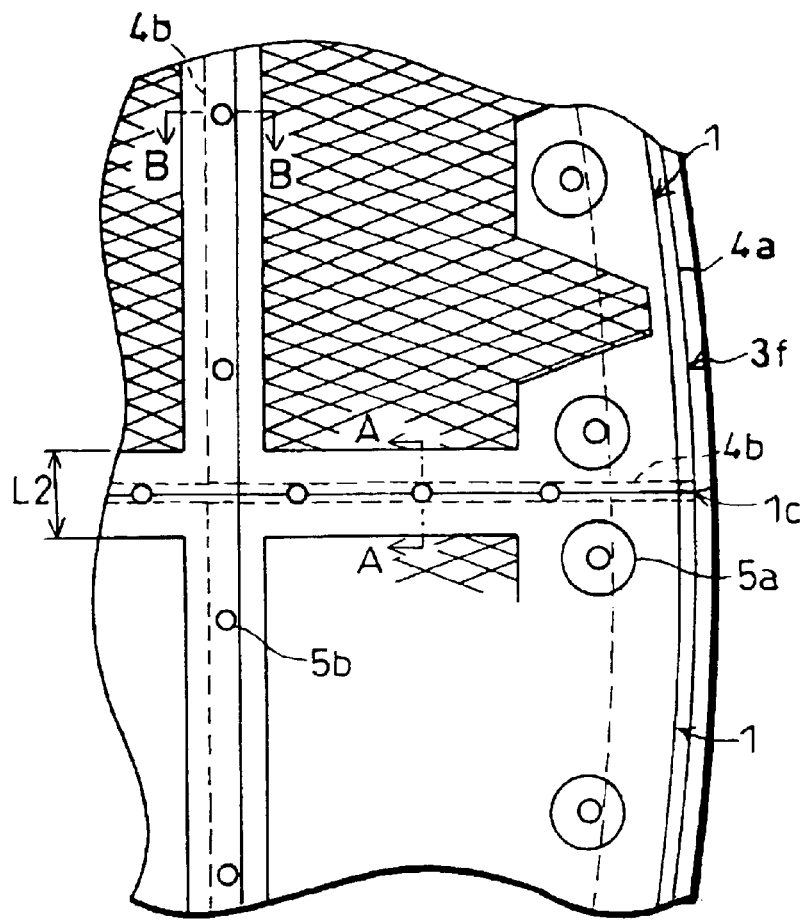
FIG. 5(a) is an explanatory drawing showing an arrangement of connecting sections of adjacent perforated trays when a plurality of perforated trays are used at the same stage in the perforated tray tower without downcomer shown in FIG. 4.

If two or more perforated trays 1 are disposed at the same stage as in the foregoing, the perforated trays 1 are mounted on the support ring 4a and the support beam 4b (both are support members) as shown in FIG. 5(a). At a connecting section 1c between the perforated trays 1, the perforated trays 1 are positioned side by side at their edges with substantially no empty space therebetween, and fixed by a clamp 5a and a bolt and nut 5b (both are fixing members) to the support ring 4a and the support beam 4b so as to maintain the closeness. Note that in FIG. 5(a) the configuration of the holes 2 formed in the perforated trays 1 is illustrated as rhombi and triangles, with the vertexes of the rhombi and triangles representing the centers of the holes. The peripheral part shown in FIG. 5(a) represents the tower wall 3f.

The support ring 4a is fixed to the tower wall so as to support the perforated trays 1 constituting the circumference of the extended perforated tray 11. The support beam 4b is disposed bridging opposite sides of the tower 3 so as to support the connecting section 1c. The clamp 5a fixes the perforated trays 1 to the support ring 4a. The bolt and nut 5b fixes the perforated trays 1 to the support beam 4b.

Figure 5B:
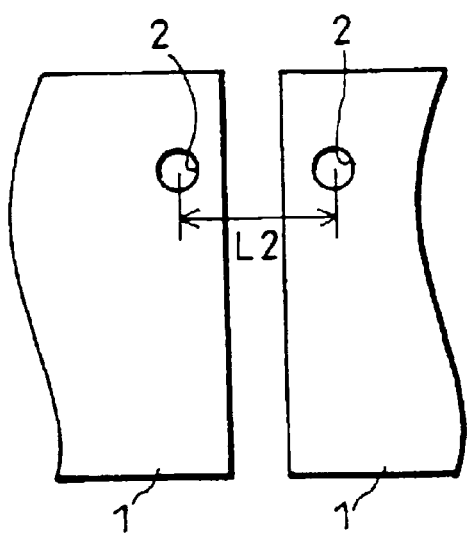
FIG. 5(b) is an explanatory drawing showing a center-to-center distance (L2) between the two most closely located holes that respectively belong to the adjacent perforated trays.

Further, if two or more perforated trays 1 are disposed at the same stage as in the foregoing, as shown also in FIG. 5(b), the center-to-center distance, L2, between the two most closely located holes 2 that respectively belong to the adjacent perforated trays 1 (center-to-center distance L2 of those holes 2 that are located side by side spaced by the connecting section 1c) connected together by the connecting section 1c is set in a range of from 50 mm to 150 mm, and preferably from 50 mm to 100 mm.

Figure 6A:
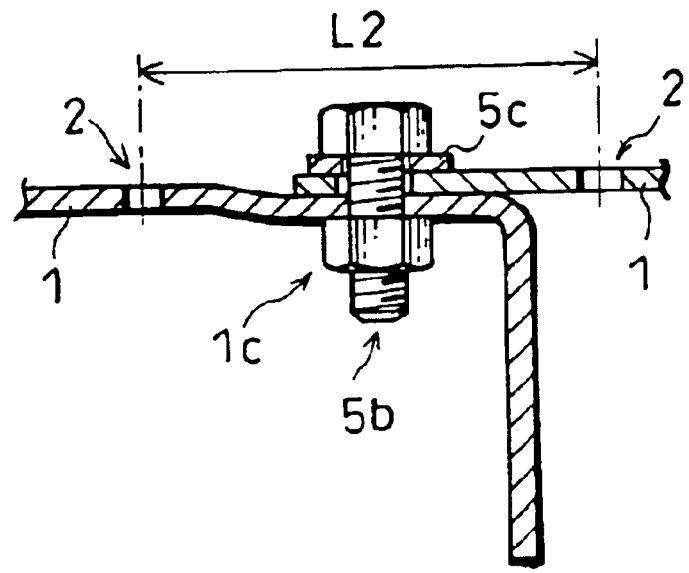
FIG. 6(a) and FIG. 6(b) are explanatory drawings illustrating arrangements of a connecting section between perforated trays.
Figure 6B:
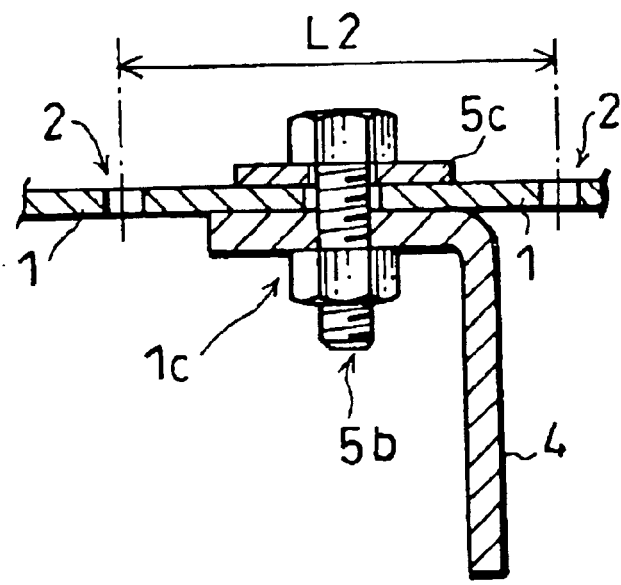

In an arrangement where, as shown in FIG. 4, a plurality of perforated trays 1 are disposed at the same stage, the connecting section 1c between two adjacent perforated trays 1 is arranged as shown in FIG. 6(b) which is a cross-sectional view taken along line A—A in FIG. 4 and FIG. 5(a) and as shown in FIG. 6(a) which is a cross-sectional view taken along line B—B in FIG. 4 and FIG. 5(a); the two perforated trays 1 are, for example, positioned side by side at their edges on the support beam 4b which has a substantially horizontal top surface or stacked one on the other at their edges, and fixed firmly by the bolt and nut 5b via a washer 5c. The areas corresponding to the parts 1d shown in FIG. 4 correspond to the overlapping parts of the adjacent perforated trays 1 fixed by the bolt and nut 5b in FIG. 6(a).

Accordingly, so as to connect a plurality of perforated trays 1 together, each perforated tray 1 needs to have at its edge a fixing area at which the perforated tray 1 is mounted to a support member, such as the support beam 4b, and then fixed by a fixing member, such as the bolt and nut 5b, or positioned at its edge alongside another perforated tray 1 and then fixed by a fixing member.

Therefore, so as to provide a space between the perforated trays 1, the center-to-center distance, L2, between the two most closely located holes 2 that respectively belong to the adjacent perforated trays 1 is preferably specified in an aforementioned range. If the center-to-center distance L2 exceeds 150 mm, liquid currents stagnate on the perforated tray 1, increasing the likelihood of polymerization occurring. If L2 is less than 50 mm, the perforated trays 1 are not firmly fixed, failing to give sufficient strength to the extended perforated tray 11.

If some of the holes are provided satisfying neither conditions (a) nor (b) as in the foregoing, the center-to-center distance between a hole 2 that satisfies both conditions (a) and (b) and a hole 2 that satisfies neither condition (a) nor (b) should not exceed 150 mm. In other words, the distances by which the holes 2 of one of the perforated trays 1 are separated from those of the other perforated tray 1 should be as short as possible.

The use of the perforated tray tower without downcomer 3, fitted with the aforementioned two or more perforated trays 1 that satisfy conditions (g) to (i), provides better control over gas and liquid currents through the holes 2 of the perforated trays 1 in distillation of an easily polymerizable compound as previously mentioned. Moreover, in a case when a plurality of perforated trays 1 are disposed at various stages, since conditions are specified on each of the plurality of perforated trays 1, it is ensured that the inner surfaces of the tower 3 is wet.

Consequently, if all conditions (g) to (i) are satisfied, both the first state where the inner surfaces of the tower 3 are wet with liquid and the second state where gas and liquid currents are prevented from channelling and stagnating are surely effected. So, the gaseous phase portion is always kept in contact with a polymerization inhibitor by subjecting it to gas and liquid contact, and the polymerization inhibitor is dispersed sufficiently as a result of the currents being prevented from channelling and stagnating; therefore, polymerization is better inhibited. For these reasons, the formation of polymers are effectively prevented.

In the perforated tray tower without downcomer 3 in accordance with the present invention, the two or more perforated trays 1 preferably satisfy condition (j) whereby the blind ratio, as defined in the following, is specified to 0.2 or larger, preferably 0.4 or larger, and more preferably 0.6 or larger.

For example, as shown in FIG. 7, the holes 2, of a perforated tray 1 located at an upper stage, illustrated by solid lines partially overlap the holes 2, of a perforated tray 1 located at a lower stage, illustrated by dotted lines; accordingly, overlapping areas and non-overlapping areas (illustrated by slanted lines) are created in the holes 2 of the two perforated trays 1. In the present invention, the blind ratio of a perforated tray 1 is defined in relation to an immediately adjacent perforated tray 1 as the sum of the non-overlapping areas in the holes 2 of the perforated tray 1 divided by the sum of both the overlapping and non-overlapping areas of the holes (opening sections) 2 of the perforated tray 1.

Accordingly, in the present invention, the "blind ratio" of the perforated trays 1 disposed respectively at vertically adjacent spacing is given by the following equation:

$$\text{Blind Ratio} = 1 - (S/T)$$

where S is the sum of the areas (illustrated by slanted lines in FIG. 7) where the holes 2 of the upper perforated trays 1 overlap the holes 2 of the lower perforated tray 1, and T is a smaller one of the sum of the areas of the holes 2 of the upper perforated tray 1 and the sum of the areas of the holes 2 of the lower perforated tray 1.

In the present invention, as previously mentioned, the blind ratio is preferably 0.2 or higher. If the blind ratio is less than 0.2, gas and liquid develop channelling currents at the same places, increasing the likelihood of polymerization occurring. Especially, if two perforated trays 1 that are identical in the hole diameter, center-to-center distance between adjacent holes 2, and opening ratio are disposed at adjacent upper and lower stages respectively so that the holes 2 of both trays are oppositely placed, the holes 2 of the upper perforated tray 1 completely overlap the holes 2 of the lower perforated tray 1, increasing the likelihood of channelling currents developing.

Thus, the perforated tray tower without downcomer 3 in accordance with the present invention is fitted with two or more perforated trays 1 that satisfy conditions (a) to (d), preferably satisfy further condition (e), and more preferably satisfy further condition (f), in such a manner to satisfy conditions (g) to (i) and preferably to satisfy further condition (j). For this reason, the perforated tray tower without downcomer 3 in accordance with the present invention is capable of effectively inhibiting the formation of polymers in distillation of an easily polymerizable compound.

Figure 8:
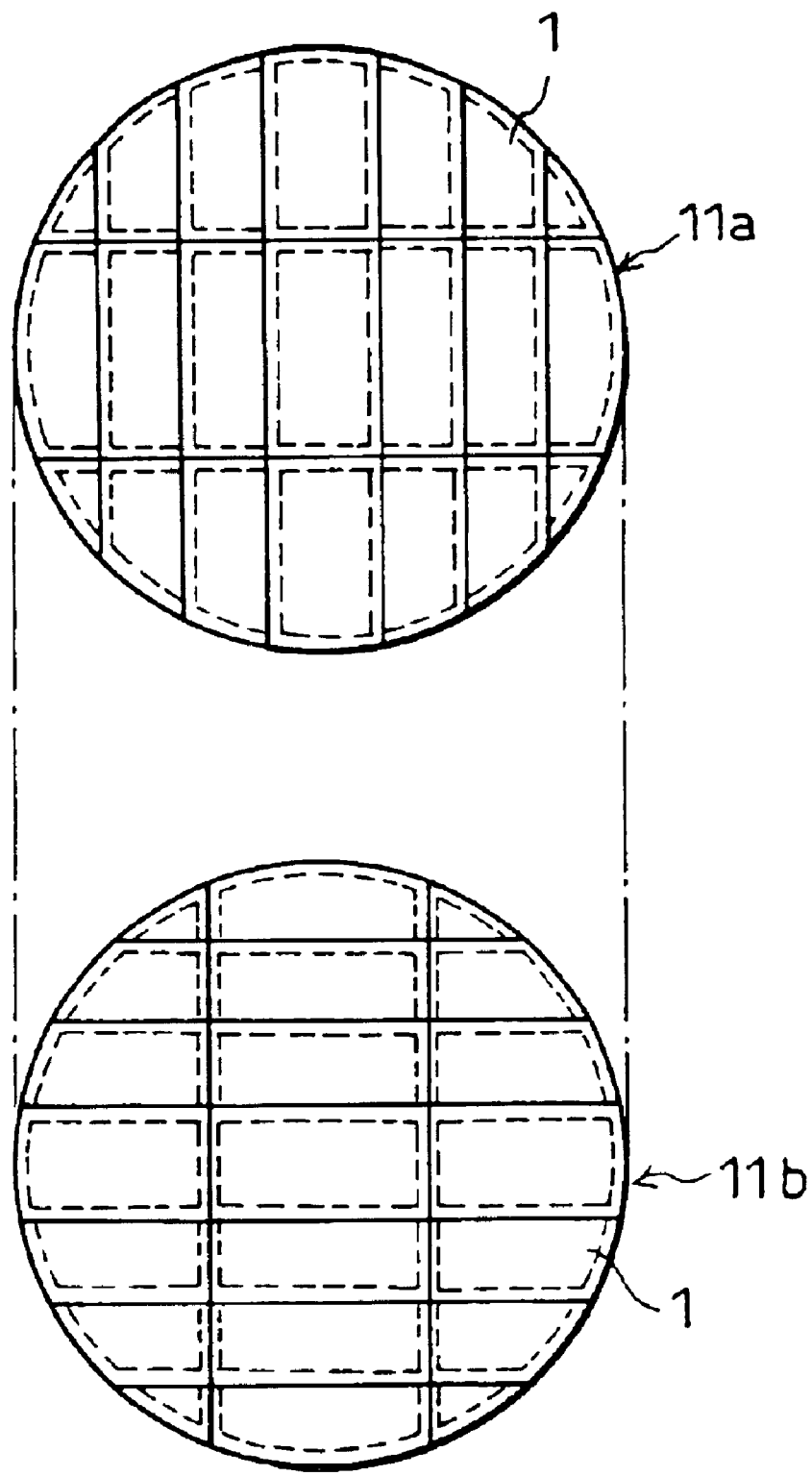
FIG. 8 is an explanatory drawing showing, in the extended perforated tray shown in FIG. 4, the orientation of the tray at an even numbered tray in relation to that at an odd numbered tray.

When a plurality of identical extended perforated trays 11, one of which is shown in FIG. 4, are installed in a perforated tray tower without downcomer 3 in accordance with the present invention, in order to satisfy condition (j), those extended perforated trays 11b at even numbered trays (corresponding to the perforated trays 1b in FIG. 3) are preferably orientated about 90° of alignment with those extended perforated trays 11a at odd numbered trays (corresponding to the perforated trays 1a in FIG. 3); an example of such a configuration is shown in FIG. 8.

The disorientation angle to satisfy condition (j) is not limited in any particular manners, and may vary appropriately depending on the shape of the perforated trays 1 constituting the extended perforated trays 11. The disorientation angle of about 90° is suitable when a circular extended perforated tray 11 is constituted chiefly from a plurality of substantially rectangular perforated trays 1 as shown in FIG. 4; if the perforated trays 1 have other shapes, other disorientation angles would be appropriate accordingly. Therefore, in the present invention, to satisfy condition (j), the extended perforated trays 11 (i.e., perforated trays 1) only need to be positioned in different orientations. Specific angles by no means affect the scope of the invention.

In the present invention, two or more perforated trays 1 satisfying the foregoing conditions may be disposed so as to satisfy at least either condition (i) or condition (j). This arrangement also gives a sufficient advantage to a perforated tray tower without downcomer 3 in accordance with the present invention.

A method of distillation in accordance with the present invention is for use in distillation of an easily polymerizable compound in the perforated tray tower without downcomer 3; therefore, a method of distillation in accordance with the present invention is implemented using a perforated tray tower without downcomer 3 fitted with two or more perforated trays without downcomer 1 that satisfy conditions (a) to (d), preferably satisfy further condition (e), and more preferably satisfy further condition (f), in such a manner to satisfy conditions (g) to (i) and preferably to satisfy further condition (j).

The method of distillation in accordance with the present invention is suitably used for distillation of an easily polymerizable compound or a liquid containing an easily polymerizable compound. Typical easily polymerizable compounds include (meth)acrylic acid as well as esters of (meth)acrylic acid, such as methyl (meth)acrylate, ethyl (meth)acrylate, n-butyl (meth)acrylate, and hydroxypropyl (meth)acrylate. The distillation as defined in the present invention includes an operation to purify a crude, easily polymerizable compound through distillation, an operation to separate and remove a predetermined compound from a liquid containing an easily polymerizable compound through distillation, etc.

In the present invention, the "distillation" includes operations to distill, strip, and absorb an easily polymerizable compound. The perforated tray tower without downcomer 3 in accordance with the present invention is suitably used especially for this distillation operation.

In the method of distillation in accordance with the present invention, preferably either one of conditions (k) and (m) detailed below are satisfied, and more preferably both conditions are satisfied.

(k) The amount of wetting liquid with respect to the tower's cross-sectional area is 0.3 m³/m²·h or higher, preferably 1 m³/m²·h or higher.

(m) The amount of wetting liquid with respect to the sum of the areas of the holes 2 is 1 m³/m²·h or higher, preferably 3 m³/m²·h or higher.

This arrangement prevents the formation of polymers more effectively. The amount of wetting liquid is here defined as the volume [m³] of liquid supplied onto the perforated tray 1 per hour divided by the tower's cross-sectional area or the sum of the areas of the holes 2.

If the amount of wetting liquid is less than 0.3 m³/m²·h with respect to the tower's cross-sectional area or less than 1 m³/m²·h with respect to the sum of the areas of the holes 2, parts of the perforated tray 1 dry, and the stabilizer agent is not evenly distributed, increasing the likelihood of polymerization occurring.

In other words, in the method of distillation in accordance with the present invention, if condition (k) or (m) is satisfied, it is ensured that the inner surfaces of the tower 3 are wet, and the amount of wetting liquid is suitable; therefore, the liquid can be stored on the perforated tray 1 at an appropriate amount, causing suitable gas and liquid currents through the holes 2. In short, if the condition (k) and/or (m) is/are satisfied, it is ensured that both the first state where the inner surfaces of the tower 3 is wet with liquid and the second state where gas and liquid currents are prevented from channelling and stagnating are satisfied; therefore the formation of polymers is even more effectively prevented.

In the following, specific examples and comparative examples will be presented to illustrate the present invention in more detail. The following examples and comparative examples will present best modes each satisfying all of conditions (a) to (k) and (m), which by no means limit the scope of the present invention. In other words, in the present invention, at least an essential condition(s) among the foregoing conditions should be satisfied in accordance with various alternatives in distillation as previously mentioned.

EXAMPLE 1

Acrylic acid was distilled using a perforated tray tower without downcomer satisfying conditions (g) to (j) fitted with perforated trays without downcomer satisfying conditions (a) to (d), as well as having holes 2 each of which is flat at its edge on its upper side and rounded at its edge on the lower side (i.e., satisfying conditions (e) and (f)), according to a method satisfying conditions (k) and (m).

Condition (a): Hole Diameter d=18 mm

Condition (b): Center-to-center Distance L1 between Adjacent Holes c=32 mm

Condition (c): Tray Thickness=3 mm

Condition (d): Opening Ratio=18%

Condition (g): Interval between Perforated Trays H=0.25 D (D: Tower Diameter)

Condition (h): Levelness=3 mm

Condition (i): Center-to-center distance between Two Most Closely Located Holes that Respectively Belong to Adjacent Perforated Trays L2=80 mm Condition (j): Blind Ratio=0.65

Condition (k): Amount of Wetting Liquid (with respect to Tower's Cross-sectional Area)=1.0 m³/m²·h Condition (m): Amount of Wetting Liquid (with respect to Sum of Areas of Holes)=5.0 m³/m²·h That is, a liquid composed of 85 percent by weight acrylic acid and 14 percent by weight acetic acid was fed at a mid-stage of the tower that was fitted with 30 trays, and the system was operated at a tower top pressure of 5.3 kPa absolute (40 mmHg) and a tower top temperature of 44° C. continuously for two months. Hydroquinone was added as a polymerization inhibitor through a tower top an amount of 100 ppm for tower top vapor flow rate. Further, an oxygen-containing gas was supplied a predetermined amount into the tower bottom. After completion of the operation, the tower interior was inspected: results are shown in Table 1.

COMPARATIVE EXAMPLES 1 TO 13

Acrylic acid was distilled in the same manner as example 1, except that conditions (a) to (f) for the perforated trays without downcomer, conditions (g) to (j) for the perforated tray tower without downcomer, and condition (k) for the distillation operation were changed as shown underlined in Table 1; results of comparative examples 1 to 12 are all shown in Table 1. Condition (m) for the distallation operation can be calculated by the following equation:

Condition (m)=Amount of Wetting Liquid/{(Opening Ratio)/100} where the amount of wetting liquid is given in condition (k) and the opening ratio is given in condition (d).

TABLE 1

| Conditions<br>Units | a<br>mm | b<br>mm | b/a<br>— | c<br>mm | d<br>% | e · f<br>— | g<br>% | h<br>mm | i<br>mm | j<br>— | k<br>*2 | m<br>*2 | *1<br>kg |
|---|---|---|---|---|---|---|---|---|---|---|---|---|---|
| Example 1 | 18 | 32 | 1.78 | 3 | 20 | FIG. 2(b) | 25 | 80 | 80 | 0.65 | 1 | 5.0 | 0.7 |
| Comparative Example 1 | 8 | 12 | 1.50 | 3 | 10 | FIG. 2(b) | 25 | 80 | 80 | 0.65 | 1 | 10.0 | 11.3 |
| Comparative Example 2 | 30 | 90 | 3.00 | 3 | 20 | FIG. 2(b) | 25 | 80 | 80 | 0.65 | 1 | 5.0 | 2.6 |
| Comparative Example 3 | 18 | 60 | 3.33 | 3 | 10 | FIG. 2(b) | 25 | 80 | 80 | 0.65 | 1 | 10.0 | 0.7 |
| Comparative Example 4 | 18 | 32 | 1.78 | 9 | 20 | FIG. 2(b) | 25 | 80 | 80 | 0.65 | 1 | 5.0 | 28.9 |
| Comparative Example 5 | 18 | 50 | 2.78 | 3 | 8 | FIG. 2(b) | 25 | 80 | 80 | 0.65 | 1 | 12.5 | 29.6 |
| Comparative Example 6 | 18 | 22 | 1.22 | 3 | 32 | FIG. 2(b) | 25 | 80 | 80 | 0.65 | 1 | 3.1 | 4.0 |
| Comparative Example 7 | 18 | 32 | 1.78 | 3 | 20 | FIG. 2(b) | 8 | 80 | 80 | 0.65 | 1 | 5.0 | 10.1 |

TABLE 1-continued

| Conditions | a | b | b/a | c | d | e · f | g | h | i | j | k | m | *1 |
|---|---|---|---|---|---|---|---|---|---|---|---|---|---|
| Units | mm | mm | — | mm | % | — | % | mm | mm | — | *2 | *2 | kg |
| Comparative Example 8 | 18 | 32 | 1.78 | 3 | 20 | FIG. 2(b) | <u>55</u> | 80 | 80 | 0.65 | 1 | 5.0 | 7.9 |
| Comparative Example 9 | 18 | 32 | 1.78 | 3 | 20 | FIG. 2(b) | 25 | <u>9</u> | 80 | 0.65 | 1 | 5.0 | 48.2 |
| Comparative Example 10 | 18 | 32 | 1.78 | 3 | 20 | FIG. 2(b) | 25 | 160 | <u>160</u> | 0.65 | 1 | 5.0 | 15.2 |
| Comparative Example 11 | 18 | 32 | 1.78 | 3 | 20 | FIG. 2(b) | 25 | 80 | 80 | <u>0.15</u> | 1 | 5.0 | 17.6 |
| Comparative Example 12 | 18 | 32 | 1.78 | 3 | 20 | FIG. 2(b) | 25 | 80 | 80 | 0.65 | <u>0.15</u> | <u>0.8</u> | 20.9 |
| Comparative Example 13 | 18 | 32 | 1.78 | 3 | 20 | <u>FIG. 2(a)</u> | 25 | 80 | 80 | 0.65 | 1 | 5.0 | 5.8 |

*1: Weight of Polymer
*2: m³/m² · h

As clearly understood from Table 1 above, polymers are formed in an amount of less than 1 kg in the distillation of acrylic acid if conditions are satisfied in accordance with the present invention, and by contrast, in an amount of over 2.5 kg if conditions are not satisfied in accordance with the present invention.

As discussed so far, by using perforated trays without downcomer and perforated tray tower without downcomer satisfying those conditions above in accordance with the present invention or using a method of distillation in accordance with the present invention, it is ensured that the first state and the second state are concurrently effected; an easily polymerizable compound and a liquid containing an easily polymerizable compound can be distilled in a stable manner over an extended period of time, while effectively preventing the formation of polymers.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A perforated tray without downcomer provided with a plurality of holes, wherein
   each of the plurality of holes has a diameter d in a range of from 10 mm to 25 mm,
   each of the plurality of holes is separated from an adjacent hole by a center-to-center distance in a range of from 1.2 d to 3 d,
   the perforated tray without downcomer has a thickness in a range of from 2 mm to 8 mm, and
   the perforated tray without downcomer has an opening ratio in a range of from 10% to 30%,
   wherein multiple perforated trays without downcomer are used at the same stage in a perforated tray tower without downcomer, and the two most closely located holes of any respective adjacent perforated trays without downcomer are separated by a distance between 50 mm and 150 mm.

2. The perforated tray without downcomer as defined in claim 1, wherein
   the perforated tray without downcomer has a flat surface, and
   each of the plurality of holes has an edge fabricated into a round surface at least either on an upper side of the edge or on a lower side of the edge.

3. A perforated tray without downcomer in a perforated tray tower without downcomer;
   said tower comprising a plurality of perforated trays without downcomer disposed respectively at a plurality of stages, each of the plurality of perforated trays without downcomer being provided with a plurality of holes, wherein
   each of the plurality of holes has a diameter d in a range of from 10 mm to 25 mm, and each of the plurality of holes is separated from an adjacent hole by a center-to-center distance in a range of from 1.2 d to 3 d,
   wherein, when two or more of the plurality of perforated trays without downcomer Are used at the same stage, the two most closely located holes that respectively belong to adjacent perforated trays are separated from one another by a center-to-center distance in a range of from 50 mm to 150 mm.

4. A perforated tray tower without downcomer, comprising a plurality of perforated trays without downcomer disposed respectively at a plurality of stages, each of the plurality of perforated trays without downcomer being provided with a plurality of holes, wherein
   each of the plurality of holes has a diameter d in a range of from 10 mm to 25 mm,
   the perforated tray without downcomer has a thickness in a range of from 2 mm to 8 mm,
   the perforated tray without downcomer has an opening ratio in a range of from 10% to 30%, and
   each of the plurality of holes is separated from an adjacent hole by a center-to-center distance in a range of from 1.2 d to 3 d,
   wherein, when two or more of the plurality of perforated trays without downcomer are used at the same stage, the two most closely located holes that respectively belong to adjacent perforated trays are separated from one another by a center-to-center distance in a range of from 50 mm to 150 mm.

5. The perforated tray tower without downcomer as defined in claim 4, wherein
   the plurality of perforated trays without downcomer disposed respectively at vertically adjacent spacing are separated by a distance in a range of from 0.1 D to 0.5 D where D is a tower diameter, and
   each of the plurality of perforated trays without downcomer has a levelness not exceeding 8 mm.

6. The perforated tray tower without downcomer according to claim 4, wherein
   the plurality of perforated trays without downcomer disposed respectively at vertically adjacent spacing have a blind ratio of not less than 0.2 and not more than 1.

7. A method of distillation, comprising the steps of:
   providing a perforated tray tower without downcomer, comprising a plurality of perforated trays without downcomer disposed respectively at a plurality of stages, each of the plurality of perforated trays without downcomer being provided with a plurality of holes, wherein each of the plurality of holes has a diameter d in a range of from 10 mm to 25 mm, the perforated tray without downcomer has a thickness in a range of from 2 mm to 8 mm, the perforated tray without downcomer has an opening ratio in a range of from 10% to 30%, and each of the plurality of holes is separated from an adjacent hole by a center-to-center distance in a range of from 1.2 d to 3 d, wherein, when two or more of the plurality of perforated trays without downcomer are used at the same stage, the two most closely located holes that respectively belong to adjacent perforated trays are separated from one another by a center-to-center distance in a range of from 50 mm to 150 mm;

providing an easily polymerizable compound or a liquid containing an easily polymerizable compound; and distilling the easily polymerizable compound or a liquid containing an easily polymerizable compound, using the perforated tray tower.

8. The method of distillation as defined in claim 7, further comprising carrying out the distilling step under at least one of first and second conditions, the first condition being such that an amount of wetting liquid with respect to a cross-sectional area of the tower is at least 0.3 $m^3/m^2 \cdot h$, and the second condition being such that an amount of wetting liquid with respect to a sum of areas of the plurality of holes is at least 1 $m^3/m^2 \cdot h$.

9. The method of distillation as defined in claim 7, wherein the easily polymerizable compound is at least one compound selected from the group consisting of (meth)acrylic acid and esters thereof.

10. A method of distillation, comprising the step of distilling an easily polymerizable compound or a liquid containing an easily polymerizable compound, the compound being at least one compound selected from the group consisting of (meth)acrylic acid and esters thereof, wherein a plurality of perforated trays without downcomer are disposed respectively at a plurality of stages, each of the plurality of perforated trays without downcomer being provided with a plurality of holes;

each of the plurality of holes has a diameter d in a range of from 10 mm to 25 mm;

each of the plurality of perforated trays without downcomer has a thickness in a range of from 2 mm to 8 mm;

each of the plurality of perforated trays without downcomer has an opening ratio in a range of from 10% to 30%; and each of the plurality of holes is separated from an adjacent hole by a center-to-center distance in a range of from 1.2 d to 3 d.

* * * * *